United States Patent [19]
Becka

[11] Patent Number: 5,558,348
[45] Date of Patent: Sep. 24, 1996

[54] CHILD RIDING VEHICLE AND CONTROL HANDLE

[76] Inventor: George T. Becka, 119 E. Sprague Rd., Seven Hills, Ohio 44131

[21] Appl. No.: 551,002

[22] Filed: Oct. 31, 1995

Related U.S. Application Data

[60] Continuation of Ser. No. 227,611, Apr. 14, 1994, abandoned, which is a division of Ser. No. 969,987, Nov. 2, 1992, Pat. No. 5,306,030.

[51] Int. Cl.$^6$ ..................................................... B62K 5/04
[52] U.S. Cl. ...................... 280/282; 280/293; 280/47.371
[58] Field of Search ............................ 280/47.25, 47.315, 280/47.34, 47.371, 282, 288, 288.4, 293, 87.01

[56] References Cited

U.S. PATENT DOCUMENTS

| | | | |
|---|---|---|---|
| 2,672,351 | 3/1954 | Kane | 280/288.4 |
| 4,316,615 | 2/1982 | Willette | 280/47.12 X |
| 4,445,704 | 5/1984 | Troxler | 280/304.5 X |
| 4,596,398 | 6/1986 | Grossi | 280/282 |
| 4,848,780 | 7/1989 | Straub | 280/47.25 X |
| 5,028,066 | 7/1991 | Garth | 280/47.371 X |
| 5,106,108 | 4/1992 | Howell | 280/47.25 X |
| 5,154,096 | 10/1992 | Geller et al. | 280/293 X |
| 5,244,225 | 9/1993 | Frycek | 280/47.371 X |
| 5,303,944 | 4/1994 | Kalmus | 280/293 X |

*Primary Examiner*—Brian L. Johnson
*Assistant Examiner*—Victor E. Johnson

[57] ABSTRACT

A child's vehicle such as a tricycle or other pedaling or walking toy includes a goose neck handle firmly removably fixed to the lower rear end so that an adult standing behind the vehicle has complete control over the vehicle. This avoids having to stoop over or keep one or both hands on the vehicle or child during training. Two forms of handle-vehicle connections are illustrated for different type toys. In either form, the point of connection is such that the front of the vehicle may readily be elevated by depressing the handle.

10 Claims, 3 Drawing Sheets

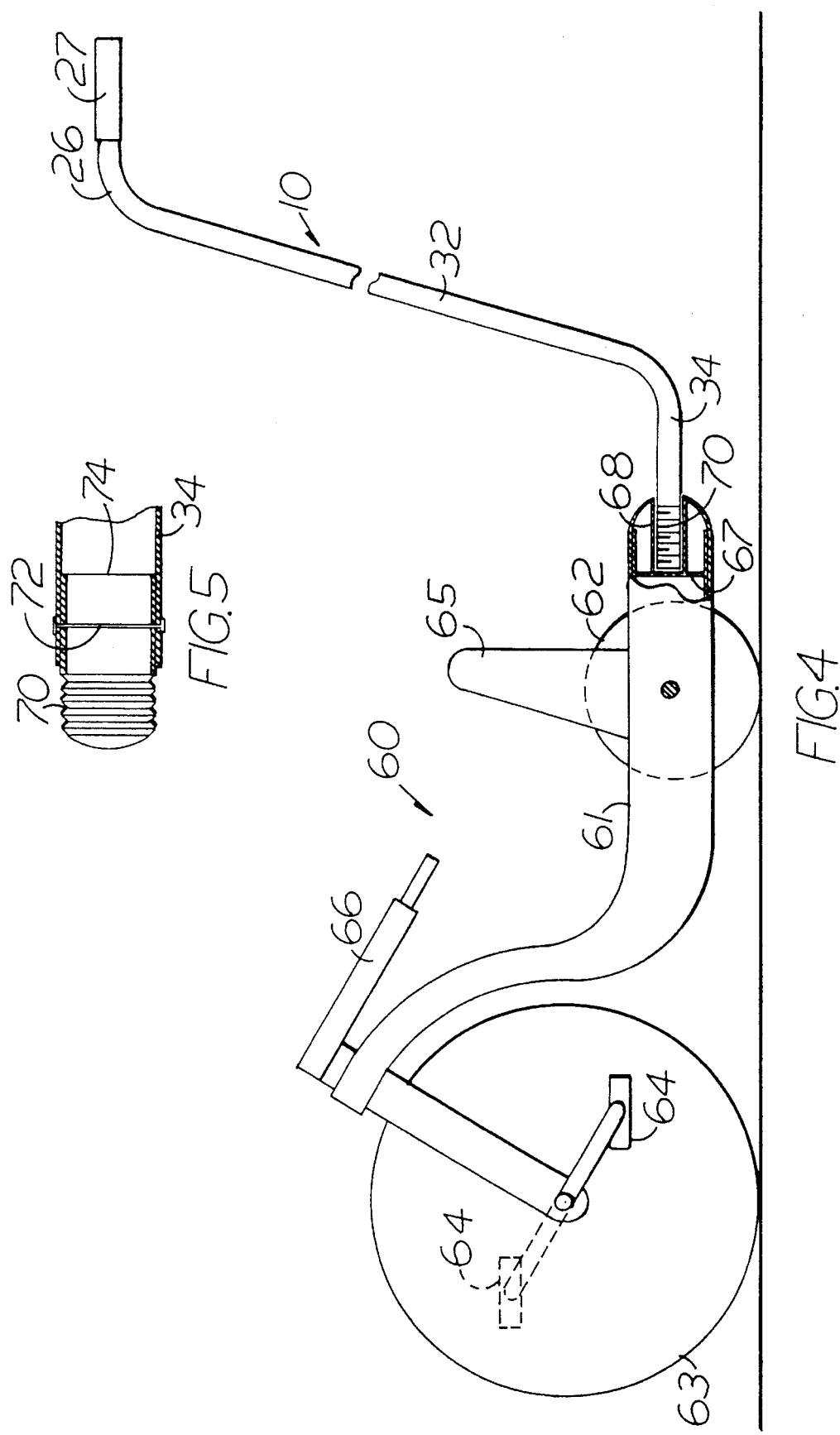

5,558,348

CHILD RIDING VEHICLE AND CONTROL HANDLE

This is a continuation of application Ser. No. 08/227,611 filed on Apr. 14, 1994, and now abandoned, which is a divisional of application Ser. No. 07/969,987 filed on Nov. 2, 1992, now Pat. No. 5,306,030.

DISCLOSURE

This invention relates generally as indicated to a child's riding vehicle and control handle, and more particularly to a goose neck control handle which can readily be attached to or removed from a child's vehicle to permit an adult standing behind the vehicle complete control over the vehicle and child.

BACKGROUND OF THE INVENTION

Training a toddler on a tricycle or other small riding vehicle can be a back breaking task. Very young children in their initial exposure to a tricycle or such vehicle have no concept or ability concerning pedaling and steering. For several days or longer they require an adult in constant attendance, usually with a hand on the tricycle or vehicle, and perhaps one also on the child. When bumps and curbs are involved, steering usually also requires two hands. It is not uncommon for the adult to have difficulty straightening up, even after the briefest training session. It sometimes takes weeks or months for a toddler to learn how to move or pedal the vehicle and also to steer.

It is therefore desirable for the adult to be able to control the small riding vehicle from behind without having to bend over constantly. It is also important that the adult be able to manipulate the vehicle over curbs or bumps while still maintaining control. It is also desirable that the form of control be readily attachable and removable from the vehicle since more than one child may be using the vehicle, and since the child will eventually outgrow the need for constant care and supervision when using the vehicle.

SUMMARY OF THE INVENTION

A device is provided for an adult standing behind a child's vehicle such as a tricycle, to steer and control the vehicle and even lift the front end thereof. The control means is in the form of a goose neck handle which has one end in the form of a rearwardly extending horizontal hand grip at approximately the adult's waist elevation, the other lower horizontal end of which may firmly quickly be attached to a position adjacent or beneath the axis of the rear wheels.

In one form, the lower end of the handle may be quickly clamped to the bottom of the rear stand or step of a tricycle, and below the rear wheel axle. In another form, the lower end of the tubular handle may be fitted into a socket in the back of a plastic toy vehicle.

In either form, an adult may control the vehicle from behind without having to bend over, and may readily assist the vehicle over a curb or bump since downward pressure on the handle will easily raise the front end of the vehicle.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 4 is a side elevation, partially broken away and in section showing the handle attached to a plastic toy vehicle; and FIG. 5 is an enlarged fragmentary section showing the threaded stud on the lower end of the handle.

DETAILED DESCRIPTION OF THE PREFERRED EMBODIMENTS

Figure 1:
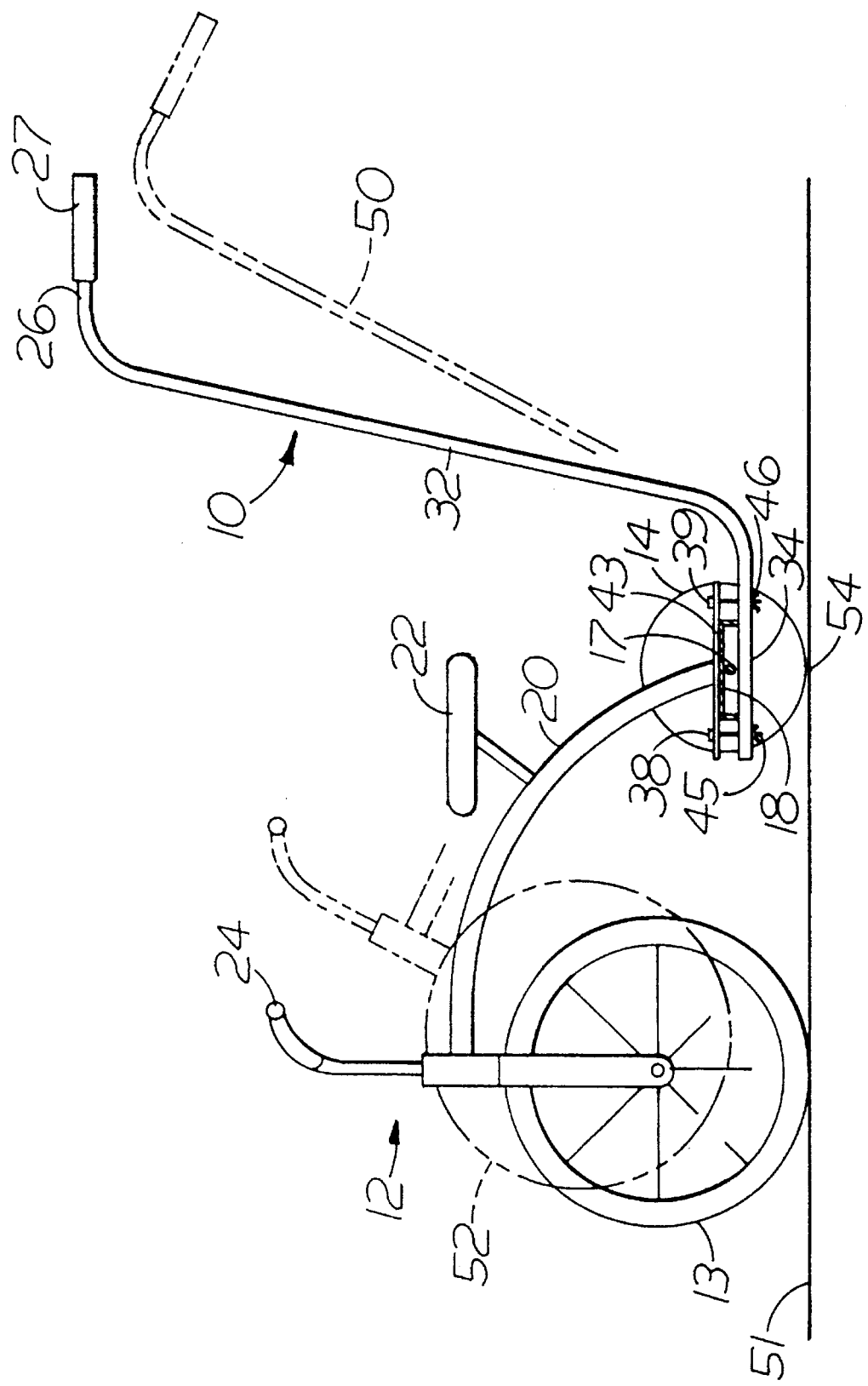
FIG. 1 is a side elevation partially in section showing a tricycle with a control handle attached below the rear step and rear wheel axle, the elevation of the front end being shown in dotted lines.
Figure 3:
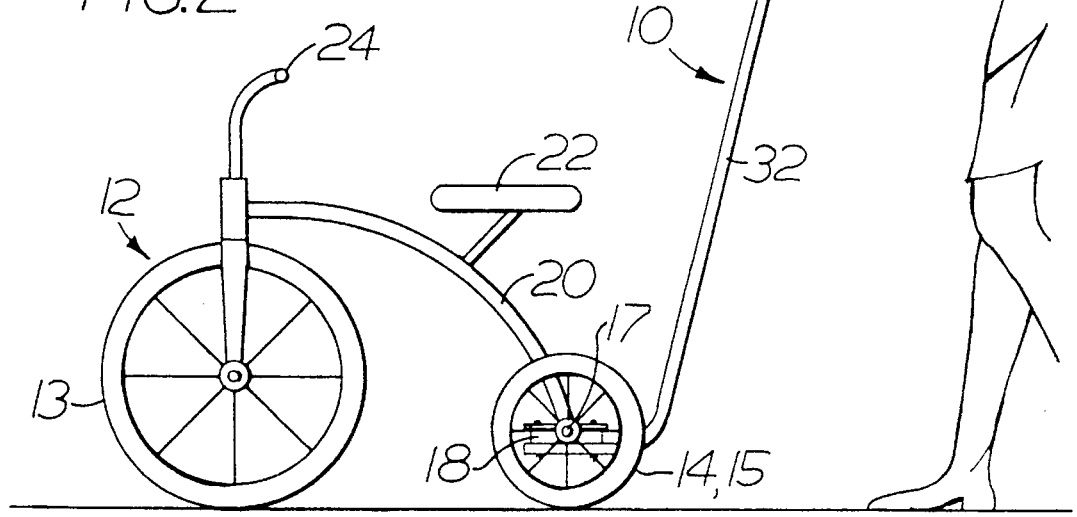
FIG. 3 is a view similar to FIG. 1, but illustrating the position of the adult behind the vehicle.

Referring initially to FIGS. 1 and 3, there is illustrated a goose neck control handle shown generally at 10, affixed to a tricycle shown at 12. As is typical, the tricycle comprises a steerable front wheel 13, and a pair of smaller laterally spaced rear wheels 14 and 15. The rear wheels are interconnected by axle 17 which extends beneath inverted channel shape step 18 which spans the rear wheels and which is rigidly connected to the frame 20. The frame supports the child's seat 22 from which the handle bars 24 may be reached. The toddler's tricycle is simply one form of child's toy or vehicle to which the present invention is applicable.

Figure 2:
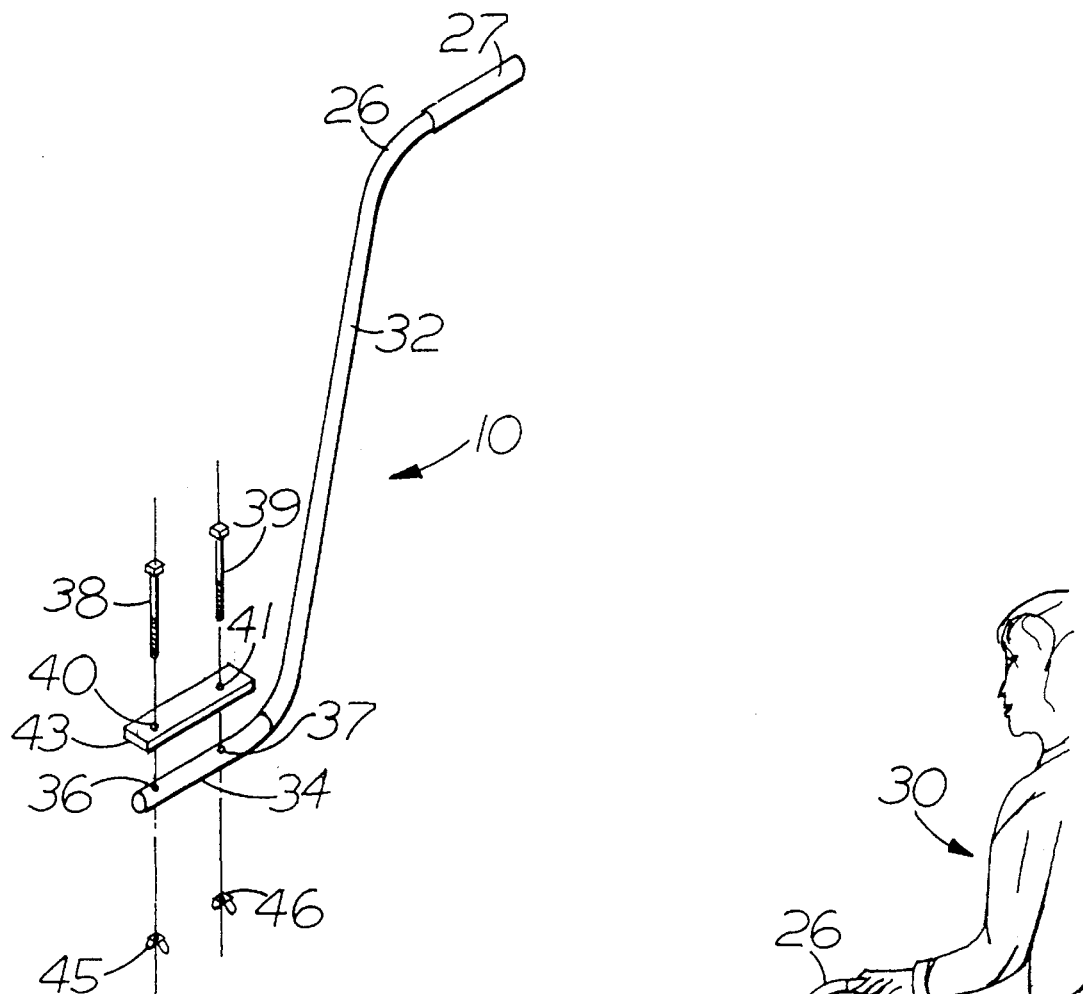
FIG. 2 is an exploded view of the handle showing the means of attachment to the tricycle.

As seen in FIGS. 1 and 2, the control handle includes an upper horizontal end 26 with a hand grip 27, which as seen in FIG. 3 is at approximately the waist height of the adult user shown generally at 30 so that the handle may firmly be gripped without bending over.

The goose neck handle curves into a main shank portion 32 which is inclined from horizontal at about 75° with the lower end shown generally at 34. The entire handle may be constructed of tubular metal and is relatively lightweight and strong.

As seen more clearly in FIG. 2, the lower end portion 34 is provided with at least two horizontally vertically extending holes shown at 36 and 37 which extend diametrically through the tube. Such holes accommodate the shanks of bolts 38 and 39, respectively, which also extend through holes 40 and 41, respectively, in clamp bar 43. Wing nuts seen at 45 and 46 are adapted to be threaded on the bolts.

It will be appreciated that there may be more than two sets of holes in the lower portion 34 and in the clamp bar since the rear step or stand 18 may vary in width on tricycles. The two holes closest to the edge of the stand 18 would be employed to affix the handle to a tricycle.

Such handle may quickly be affixed to the tricycle by placing the clamping plate on the step, threading the bolts through the appropriate set of holes in the plate and horizontal lower portion of the handle, and tightening the wing nuts on the bolts from below. The handle is then firmly attached below the rear axle. The handle can also thus easily be removed.

As seen by the phantom lines at 50 in FIG. 1, by depressing the handle, the front end and steering wheel may readily be elevated off the ground 51 as shown by the phantom line position 52. This renders handle bar steering inoperative with the tricycle being controlled entirely by the adult behind the tricycle. This ability to elevate the front wheel also assists in moving over curbs, bumps and the like. The position of the lower end of the handle so near the pivot point 54 for the handle-tricycle system, enables the pivoting to take place with little downward pressure on the hand grip 27.

Referring now to FIGS. 4 and 5, many toddlers' vehicles, whether three wheel or four wheel are constructed of rotationally cast plastic rather than in the typical configuration of a tricycle. One such vehicle is seen in FIG. 4, shown generally at 60, and includes a hollow plastic frame 61 supported by two rear wheels, one of which is shown at 62, and a large steerable front wheel 63 provided with pedals 64. The vehicle includes a seat back 65 and handle bars 66.

The rear of the frame is provided with a reinforcing internal wall 67 which forms a bottom or end of horizontal internally threaded socket 68. The socket 68 opens through the back of the vehicle.

The handle 10 may be identical to the handle used with the tricycle in the FIG. 1 embodiment. However, instead of the clamp plate, bolts and wing nuts, the end of the horizontal lower end is provided with a projecting threaded stud or knob 70, which is secured to the tubular end by transverse fastener 72 which may pass through the hole closest to the end. The stud sleeve 74 simply telescopes into the handle end against a stop and is rotated to align the holes for insertion of the fastener which may, for example, be a pin or a nut and bolt assembly. This alignment together with a marker on the stud positions the external threads so that the entire handle may quickly be threaded into the internal threaded socket and when tightened, will be in the upright position seen in FIG. 4. The control handle is used the same way as in FIGS. 1 and 2.

It can now be seen that the present invention avoids back breaking bending, while training a child on a tricycle or other similar vehicle. With the present invention, the adult can spend more enjoyable time with the child aiding the child's muscular development and coordination. The invention allows the adult total control over the vehicle and child. The handle requires no tools or drilling to secure in place and can easily be removed when no longer required, without scratching or marring the vehicle.

I claim:

1. In combination a child's riding vehicle and a rearwardly and upwardly projecting control handle, the vehicle including at least one steerable front wheel, a hollow plastic frame, a pair of laterally spaced rear wheels having a common axis, a socket means for receiving a lower end of said control handle positioned rearwardly of said axis, the socket means formed integrally with and internally of said plastic frame, and a means for rigidly fastening the lower end of the control handle to the socket means, whereby an adult can control the speed of the vehicle through the use of the handle and can elevate the front wheel of the vehicle so as to control the direction of the vehicle through the use of the handle.

2. The combination according to claim 1, wherein the socket means is positioned approximately level with the axis of the rear wheels, whereby the vehicle may be tilted rearwardly with minimal downward pressure on the handle.

3. The combination according to claim 1, wherein the socket means is a threaded socket and the handle includes a threaded stud at the lower end, the handle adapted to be threaded into the socket to fasten the lower end of the control handle to the vehicle.

4. The combination according to claim 3, wherein the stud is removably secured to the lower end of the handle.

5. The combination according to claim 1 wherein the handle includes upper and lower ends and an intermediate inclined section therebetween, the upper end extending rearwardly from the vehicle and terminating in a rearwardly extending handgrip at a convenient height for an adult standing behind the vehicle.

6. The combination set forth in claim 5 wherein the angle of inclination of the intermediate section is such that downward pressure on the hand grip elevates the steerable front wheel.

7. The combination according to claim 1, wherein the handle is a hollow tube.

8. The combination set forth in claim 1 wherein the handle includes upper and lower ends and an intermediate inclined section therebetween, the upper end extending directly rearwardly from the vehicle and terminating in a rearwardly extending handgrip at a convenient height for an adult standing behind the vehicle.

9. The combination set forth in claim 8 wherein the lower end of said handle is received in said socket mean.

10. The combination set forth in claim 9 including a stud on the lower end of said handle received in said socket mean, and a transverse fastener extending through the lower end of said handle and stud to secure the same together.

* * * * *